(12) United States Patent
Vekslar et al.

(10) Patent No.: US 6,389,469 B1
(45) Date of Patent: *May 14, 2002

(54) SYSTEM AND METHOD FOR CUSTOMIZED CONTENT DELIVERY

(75) Inventors: Gady Vekslar, Beut; Guy Ernest, Tal Aviv, both of (IL)

(73) Assignee: Targetize Innovative Solutions Ltd., Tel Aviv (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/534,962

(22) Filed: Mar. 27, 2000

(51) Int. Cl.[7] ................................................ G06F 13/00

(52) U.S. Cl. ...................... 709/226; 709/219; 709/227; 709/231; 709/232

(58) Field of Search ................................ 709/203, 217, 709/219, 223, 226, 227, 229, 232, 238, 328, 329, 231

(56) References Cited

U.S. PATENT DOCUMENTS

| | | | | |
|---|---|---|---|---|
| 5,987,454 A | * | 11/1999 | Hobbs | 707/4 |
| 6,014,701 A | * | 1/2000 | Chaddha | 709/226 |
| 6,029,195 A | * | 2/2000 | Herz | 709/219 |
| 6,055,510 A | * | 4/2000 | Henrick et al. | 705/14 |
| 6,151,632 A | * | 11/2000 | Chaddha et al. | 709/231 |
| 6,157,924 A | * | 12/2000 | Austin | 707/10 |
| 6,164,975 A | * | 12/2000 | Weingarden et al. | 434/322 |

* cited by examiner

*Primary Examiner*—Viet D. Vu
(74) *Attorney, Agent, or Firm*—Mark M. Friedman (57) ABSTRACT

A system for delivering content desired by a specific user among a plurality of users directly to a user client of the specific user via the Internet is disclosed. The system comprises at least one server including a memory. The at least one server is designed and configured for (a) receiving a user profile from the specific user, the user profile defining user preferences with respect to a plurality of criteria; (b) storing a plurality of content items in the memory, each of the items having a content profile with respect to the plurality of criteria; (c) assembling a packet of content items, each of the items in the packet being characterized by a correspondence between the user profile and the content profile; and (d) sending the packet to the user client of the specific user.

44 Claims, 3 Drawing Sheets

Figure 1

SYSTEM AND METHOD FOR CUSTOMIZED CONTENT DELIVERY

FIELD AND BACKGROUND OF THE INVENTION

The present invention relates to a system and method for delivering customized content to users based upon their preferences and, more particularly, to a system and method for periodically evaluating content with respect to individual user preferences and sending packs of suitable content items directly to a user client operated by an individual user.

The Internet is rapidly becoming a primary information resource of the modern World. Internet use worldwide is constantly increasing, and people increasingly perceive the Internet as the largest and most available information resource. However, many Internet users have difficulty retrieving the content they seek in a timely fashion. This difficulty arises from a variety of factors, including, but not limited to, the vast size and complexity of the Internet, the dynamic nature of the Internet, and lack of experience in using available search and retrieval methods.

Available search and retrieval methods typically include portals, search engines, and bookmarks (alternately referred to as favorites or hot links). Portals are Internet sites with links to other Internet sites. As an example, an Internet site of the National Football League (NFL) might contain links to Internet sites of NFL teams, NFL players, and purveyors of products carrying an NFL trademark. In this way, the NFL Internet site would serve as a portal for football content. However, a football fan interested in, for example, a single NFL team, two college football teams, and all the activities of high school football teams in his hometown does not have all of his content needs supplied by the NFL Internet portal.

This user might use a search engine to retrieve a list of Internet sites dealing with football. Depending upon their level of expertise, users of search engines may or may not succeed in finding the information they desire. Typically inexperienced users of a search engine either retrieve large amounts of irrelevant content, or exclude a significant portion of the desired content, depending upon the way in which they carry out their search.

Assuming that the hypothetical Internet user finds the Internet sites which provide content pertaining to the chosen single NFL team, the desired two college football teams, and all the activities of high school football teams in his home town, the user would typically place these Internet addresses in a bookmark list. The bookmark list allows the user to quickly return to the selected sites, but it does not allow simultaneous retrieval of desired content from all of the sites, and some of the sites may present a significant quantity of unwanted content, for example advertising. Visiting multiple Internet sites and retrieving unwanted content from these sites requires more time than using a single information resource which would contain only content suited to a particular user information profile.

Assuming that the user in the above example succeeds in locating all of the desired information and organizing the appropriate sites in a bookmark list, visiting all of the sites periodically is still necessary to keep aware of changes, additions or updates. For this reason, many sites offer e-mail subscription lists which makes users aware of changes and additions to site content by e-mail announcement. However, these announcements do not deliver the new content, the user must visit the site in order to retrieve it. Sometimes the new content is not delivered in order to keep the e-mail messages small, in other cases the content provider uses the e-mail messages to increase traffic at their Web site.

There is thus a widely recognized need for, and it would be highly advantageous to have, a system and method for delivering desired content directly to individual users based upon their preferences.

SUMMARY OF THE INVENTION

According to one aspect of the present invention there is provided a system for delivering content desired by a specific user among a plurality of users directly to a user client of the specific user via the Internet. The system comprises at least one server including a memory. The at least one server is designed and configured for (a) receiving a user profile from the specific user, the user profile defining user preferences with respect to a plurality of criteria; (b) storing a plurality of content items in the memory, each of the items having a content profile with respect to the plurality of criteria; (c) assembling a packet of content items, each of the items in the packet being characterized by a correspondence between the user profile and the content profile; and (d) sending the packet to the user client of the specific user.

According to another aspect of the present invention there is provided a system for receiving content desired by a specific user among a plurality of users via the Internet. The system comprises at least one user client including a memory. The at least one user client is designed and configured for (a) transmitting a user profile from the specific user to a server, the user profile defining user preferences with respect to a plurality of criteria; (b) receiving a packet of content items in the memory, each of the items having a content profile with respect to the plurality of criteria, and notifying the specific user of receipt of the packet; (c) storing the packet of content items in a memory device of the user client; and (d) making available to the specific user the content items in the packet.

According to yet another aspect of the present invention there is provided a method for delivering content desired by a specific user among a plurality of users directly to a user client of the specific user via the Internet. The method comprises the steps of (a) receiving a user profile from the specific user, the user profile defining user preferences with respect to a plurality of criteria; (b) storing a plurality of content items, each of the items having a content profile with respect to the plurality of criteria; (c) assembling a packet of content items, wherein each of the items in the packet is characterized by a correspondence between the user profile and the content profile; and (d) sending the packet to the user client of the specific user.

According to still another aspect of the present invention there is provided a method for delivering content desired by a specific user among a plurality of users directly to the user by means of a user client of the specific user which is in communication with the Internet. The method comprises the steps of: (a) transmitting a user profile from the specific user to a server, the user profile defining user preferences with respect to a plurality of criteria; (b) receiving a packet of content items, each of the items having a content profile with respect to the plurality of criteria and notifying the specific user of the receipt; (c) storing the packet of content items in a memory device of the user client; and (d) making available to the specific user the content items in the packet.

According to further features in preferred embodiments of the invention described below, each of the items in the packet is selected from the group consisting of a digital file, a compressed digital file, and a digital file buffered to the size of a communication protocol pack length.

According to still further features in the described preferred embodiments, each of the content items in the packet contains at least one item selected from the group consisting of a picture, text, audio information, an animated picture, a video image and video animation and any other media which can be displayed or acted upon.

According to still further features in the described preferred embodiments, the plurality of criteria include at least one criterion selected from the group consisting of a country of origin, a language, a date, a topic, a keyword and a key phrase.

According to still further features in the described preferred embodiments, the user profile and the content profile each independently contain values for each of the at least one criterion, the values are selected from the group consisting of a predefined list of values, a specific numerical value, a range of numerical values, a rating assigned by an organization and a user mark.

According to still further features in the described preferred embodiments, the user mark is a value between −1 and +1.

According to still further features in the described preferred embodiments, the correspondence between the user profile and the content profile is selected from the group consisting of a Boolean correspondence and a statistical correspondence.

According to still further features in the described preferred embodiments, sending the packet occurs when bandwidth is available on a channel of communication between the user client and the server, such that connectivity of the user client is affected as little as possible by sending of the packet by the server.

According to still further features in the described preferred embodiments, the server is further designed and configured to receive communications from the user client informing the server of user reactions to the items in the packet and to update the user preferences in the user profile in accordance with the reactions.

According to still further features in the described preferred embodiments, the server is further designed and configured to receive communications from the user client informing the server of an internet surfing activity of the user and to update the user preferences in the user profile in accordance with the internet surfing activity.

According to still further features in the described preferred embodiments, the user profile identifies the user only by means of an item selected from the group consisting of the user client used by the user and a random number.

According to still further features in the described preferred embodiments, the content items stored in the memory contain the content desired by the specific user, the content being downloadable to the user client so as to be available to the user without a network connection.

According to still further features in the described preferred embodiments, the user client is further designed and configured to communicate with the server for informing the server of user reactions to the items in the packet.

According to still further features in the described preferred embodiments, the user client is further designed and configured to communicate with the server for informing the server of an internet surfing activity of the user.

The present invention successfully addresses the shortcomings of the presently known configurations by providing a system and method for automatically delivering customized content to users based upon their changing preferences on an ongoing basis.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention is of a system and method for automatically delivering customized content to users which can be used to provide content which corresponds to a user profile. Specifically, the present invention can be used to provide content on an ongoing basis and to adjust the user profile over time so that the provided content continues to match user preferences as those preferences change.

For purposes of this specification and the accompanying claims, the phrase "user client" generally refers to a computer and includes, but is not limited to, personal computers (PC) having an operating system such as DOS, Windows™, OS/2™ or Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS of Sun Microsystems™; or any other known and available operating system; personal digital assistants (PDA), cellular telephones having at least some computer and/or PDA capabilities and Web TVs.

For purposes of this specification and the accompanying claims, the term "Windows™" includes but is not limited to, Windows2000™ Windows95™, Windows 3.x™ in which "x" is an integer such as "1", Windows NT™, Windows98™, Windows CE™ and any upgraded versions of these operating systems by Microsoft Corp. (USA).

For purposes of this specification and the accompanying claims, the term "server" refers to any computing device capable of transferring, or serving, at least one electronic file to at least one other computing device.

For purposes of this specification and the accompanying claims, "server" and "user client" are indications of function rather than specific hardware configurations, such that a single computing machine may function in some instances as a user client and in other instances as a user client.

For purposes of this specification and the accompanying claims, the term "communication" and the phrase "communication channel" each individually refer to any means of information transfer, including, but not limited to, a telephone connection, a cellular telephone connection, an Internet connection, an Extranet connection, a satellite connection, an infrared frequency transmission connection, cables connection, a local area network connection or a radio frequency connection, or any other wired or unwired connection or any combination thereof For purposes of this specification and the accompanying claims, the terms "information" and "content" are considered synonymous and are used interchangeably.

For purposes of this specification and the accompanying claims, the term "memory" refers to local storage devices including, but not limited to hard drives, re-writeable media (e.g., ZIP™ disks, JAZZ™ disks, magneto-optical cartridges, and magnetic tape) as well as remote servers or remote hard drives.

The principles and operation of a system and method for delivering customized content to users based upon their preferences according to the present invention may be better understood with reference to the drawings and accompanying descriptions.

Figure 1:
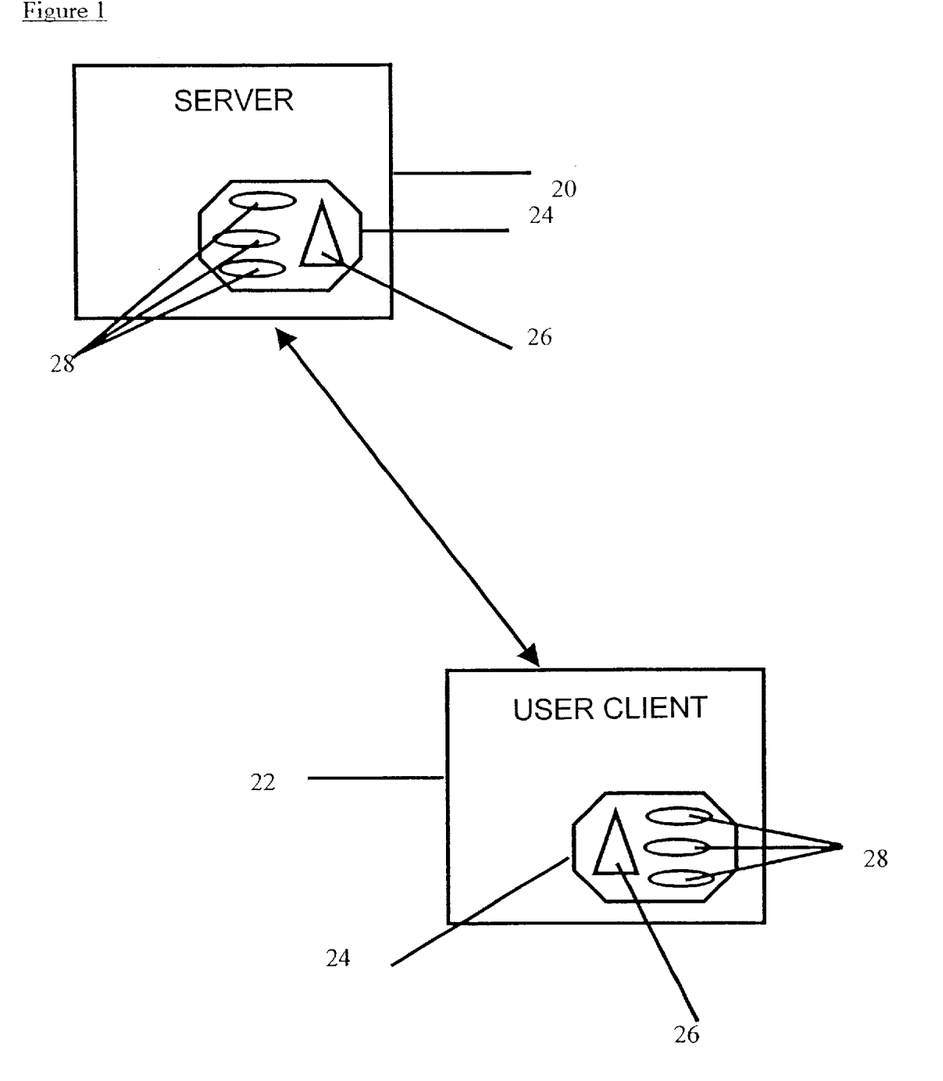
FIG. 1 is a diagram of a server according to the present invention in communication with a user client according to the present invention.

Referring now to the drawings, FIG. 1 illustrates the two systems of the present invention. The double-headed arrow indicates a bi-directional channel of communication between a server 20 and a user client 22. For simplicity, a single server 20 and a single user client 22 are shown although the scope of the invention specifically includes systems with multiple servers 20, multiple user clients 22, or multiple servers 20 and multiple user clients 22.

The first system serves for delivering content desired by a specific user among a plurality of users directly to a user client 22 of the specific user via the Internet. The system includes at least one server 20 including a memory 24. Server 20 is designed and configured to perform at least four functions.

The first function of server 20 is receiving a user profile 26 from the specific user. In order to protect user privacy, user profile 26 typically identifies the user only by means of the user client used by the user. In some cases anonymous demographic information such as age, gender, location of residence, political affiliation, socioeconomic status, and marital status may be included at the discretion of the user. User profile 26 defines user preferences with respect to a plurality of criteria. The plurality of criteria may include, for example, criterion such as, but not limited to, a country of origin, a language, a date, a topic, a keyword or a key phrase.

User profile 26 may be updated or changed at any time by a user, and may be updated automatically by server 20 as explained hereinbelow.

The second function of server 20 is to store a plurality of content items 28 in memory 24, each item 28 having a content profile with respect to the same plurality of criteria used in the user profile. The content profile is typically supplied by a content provider. Content providers might include, but are not necessarily limited to, commercial entities, non-profit organizations, news agencies, government agencies and individuals.

The third function of server 20 is to assemble a packet of content items 28. Each of items 28 in the packet is characterized by a correspondence between user profile 26 and the content profile. User profile 26 and the content profile each independently contain values for each of the at least one criterion. The values may be, for example, selected from a predefined list of values, a specific numerical value, a number from within a continuous range of numerical values, a rating assigned by an organization or a user mark. The user mark is, for example, a value between −1 and +1 assigned by the user to each criterion, where −1 indicates the strongest possible aversion and +1 indicates the strongest possible attraction. Correspondence between the user profile and the content profile may be, for example, a Boolean correspondence or a statistical correspondence. The level of correspondence required for inclusion of a specific item 28 in the packet may be set by either the provider of the item or the user or by both the provider and the user.

Each of items 28 in the packet may be, for example, a digital file, a compressed digital file, or a digital file buffered to the size of a communication protocol pack length. Although TCP/IP is the most commonly employed protocol today in Internet communication, any communication protocol might be employed without significantly altering the function of the present invention. Each of items 28 in the packet may contain, for example, a picture, text, audio information, an animated picture, a video image, video animation and any other media which can be displayed or acted upon or any combination thereof.

The fourth function of server 20 is sending the packet to user client 22 of a specific user. Ideally, sending the packet occurs when bandwidth is available on a channel of communication between user client 22 and server 20. In this way, connectivity of user client 22 is affected as little as possible by sending of the packet by server 20. This means that server 20 is able to sense available bandwidth in the communication channel and adjust sending activity accordingly. This concept is sometimes referred to as "load balance pushing". It is important to note that a single pack may be divided into two or more packs, since the maximum pack size is a constant number of bytes determined by the communication protocol employed by the system while the size of a pack is not limited. Additionally, a single pack may be transmitted in two or more pieces if transmission is interrupted by decreased bandwidth availability. As a result, large packs may be successfully transmitted from server 20 to user client 22 even if only short intervals of Internet connectivity occur and even if each interval is characterized by narrow bandwidth.

According to a preferred embodiment of the present invention server 20 is further designed and configured to receive communications from user client 22 informing server 20 of user reactions to items 28 in the packet and to update user preferences in the user profile 26 in accordance with the reactions.

According to another preferred embodiment of the present invention server 20 is further designed and configured to receive communications from user client 22 informing server 20 of an internet surfing activity of the user and to update user preferences in the user profile 26 in accordance with the internet surfing activity.

The second system according to the present invention is designed for receiving content desired by a specific user among a plurality of users via the Internet and it synergizes with the first system described above. The second system includes at least one user client 22 including a memory 26. User client 22 is designed and configured for performing at least four functions.

The first function of user client 22 is transmitting a user profile from the specific user to a server 20. The user profile is as defined hereinabove for the first system.

The second function of user client 22 is receiving a packet of content items in memory 26, each of items 28 having a content profile as explained hereinabove, and notifying the specific user of receipt of the packet.

The third function of user client 22 is storing the packet of content items 28 in memory device 24. Content items 28 stored in memory 24 of user client 22 contain the content desired by the specific user as defined in user profile 26.

The fourth function of user client 20 is making available to the specific user content items 28 in the packet. Since the content has been downloaded from server 20 to user client 22, it is available to the user without a network connection.

User client 22 is preferably further designed and configured to communicate with server 20 for informing the server 20 of user reactions to the items in the packet for the purpose of updating user profile 26.

User client 22 is preferably further designed and configured to communicate with server 20 for informing server 20 of an internet surfing activity of the user for the purpose of updating user profile 26.

Use of the first system of the present invention constitutes a method for delivering content desired by a specific user among a plurality of users directly to a user client of the specific user via the Internet.

Figure 2:
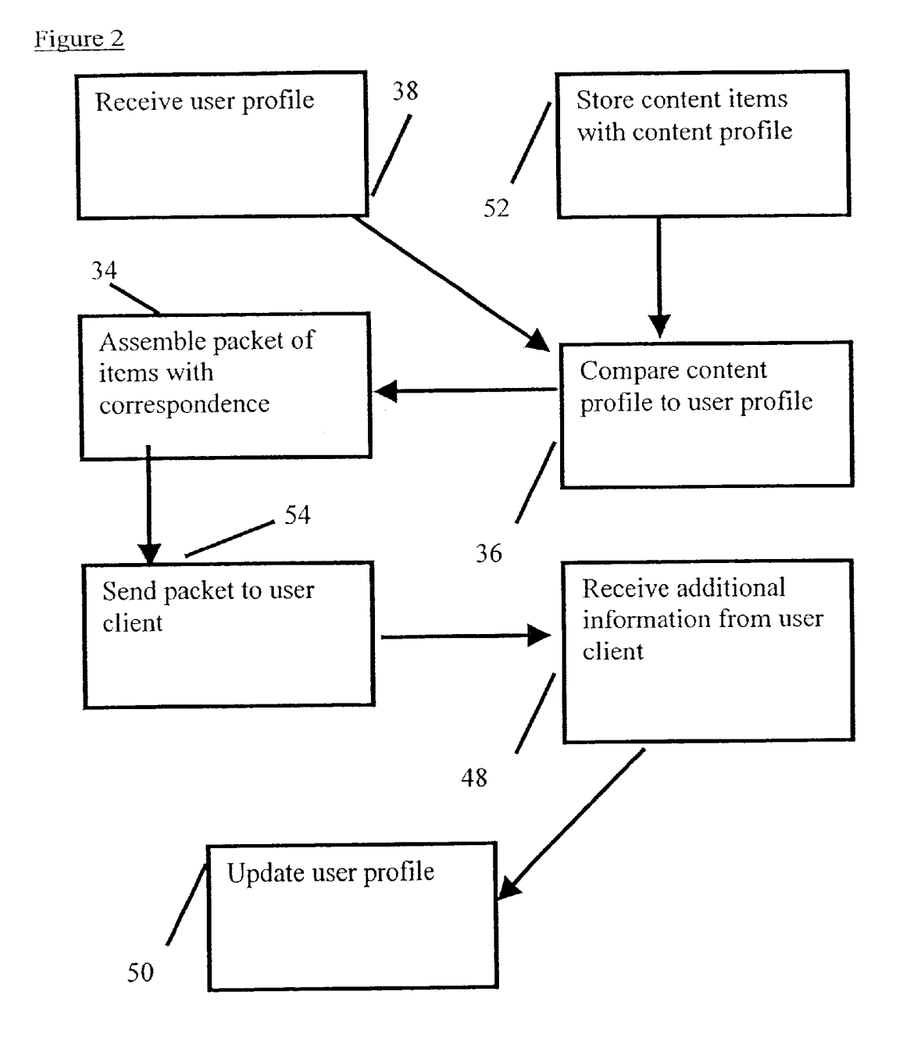
FIG. 2 is a flow diagram of a sequence of events occurring at a server according to the present invention.

As specifically shown in FIG. 2, the first step of the method includes receiving, as indicated at 38, a user profile 26 from the specific user. User profile 26 defines user preferences with respect to a plurality of criteria.

The second step of the method includes storing, as indicated at 52, a plurality of content items 28 in memory 24 of server 20, each of the items has a content profile with respect to the same plurality of criteria.

The third step of the method includes assembling a packet 34 of content items 28, wherein each of items 28 in the packet is characterized by a correspondence between the user profile and the content profile. Correspondence is determined by comparing, as indicated at 36, user profile 26 and the content profile for each item.

The fourth step of the method includes sending the packet 54 to user client 22 of the specific user.

In some cases, server 20 may receive additional information, as indicated at 48, from user client 22. This information may include, for example, reactions to content items 28, reports of Internet surfing activity or user specified updates 50 to user profile 26.

Use of the second system of the present invention constitutes a method for receiving content desired by a specific user among a plurality of users directly to the user via the Internet. This method includes four steps.

Figure 3:
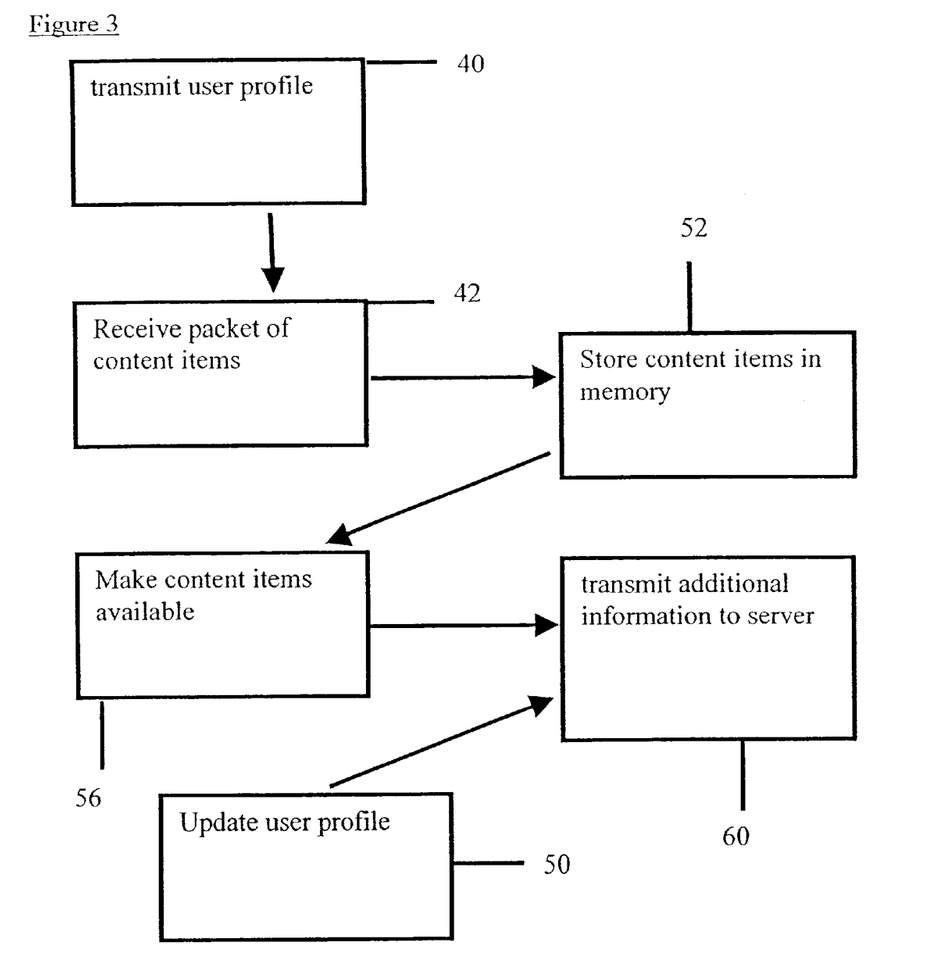
FIG. 3 is a flow diagram of a sequence of events occurring at a user client according to the present invention.

As shown in FIG. 3, the first step of this method includes transmitting 40 a user profile 26 from the specific user to server 20, user profile 26 defining user preferences with respect to a plurality of criteria.

The second step of this method includes receiving 42 a packet of content items 28, each of the items having a content profile as explained hereinabove and notifying the specific user of the receipt.

The third step of this method includes storing 52 the packet of content items 28 in memory device 24 of user client 22.

The fourth step of this method includes making available 56 to the specific user content items 28 in the packet.

In some cases, user client 22 may transmit additional information 60 to server 20. This information may include, for example reactions to content items 28, reports of Internet surfing activity or user specified updates 50 to user profile 26.

As a hypothetical illustrative example of the present invention, a user submits a user profile 26 which contains the following information to server 20. User resides in New York City. User is a 43 year old male, divorced, with two children aged 19 and 21. User is ambivalent about advertising material, likes sports, loves baseball, and is strongly interested in a recent earthquake in Nicaragua and strongly interested in the upcoming presidential primary election.

Server 20 begins to assemble a packet of content items 28 to transmit to the user. Advertising from vendors outside the New York City area is excluded, as are advertising items dealing with products for young children and married women. An item from Zaybars and another item from Citibank are included.

News items dealing with the. New York Knicks and the New York Yankees are included. Items dealing with NCAA track meets in the New York area are also included.

News items regarding rescue efforts in Nicaragua are also included, together with a report about an airplane crash in China.

Campaign literature from the Democratic Party, the Republican Party, the Libertarians and The American Socialist Party is included.

At a time when bandwidth is available, the packet is sent from server 20 to user client 22. The user receives notice of the received packet, for example in the form of a flashing icon on his computer screen. When the user is free, he opens a new window containing a summary of the packet. The summary includes the following list items:

1-Zaybars (advertising)
2-Citibank (advertising)
3-Knicks (news)
4-Yankees (news)
5-NCAA track and field (news)
6-Earthquake Nicaragua (news)
7-Plane Crash China (news)
8-Democratic Party (campaign literature)
9-Republican Party (campaign literature)
10-Libertarians (campaign literature)
1-American Socialist Party (campaign literature)

The user opens item 4 immediately. This decision is reported to server 20 which updates user profile 26 to include information on other professional baseball teams in future packets. Items 3 and 5 are deleted without opening. This decision is reported to server 20 which updates user profile 26 to exclude information relating to basketball and to amateur sports from future packets.

The user opens items 1 and 2 next. This decision is reported to server 20 which verifies that the user is ambivalent about advertising. Future packets will therefore include more advertising content about a wider range of goods and services available in the New York City area, or by mail order or by Internet.

The user has indicated a strong interest in the recent Nicaraguan earthquake because his son is serving in the Peace Corps in that country. He therefore opens item 6 and deletes item 7. These decisions are reported to server 20 which adjusts user profile 26 to reflect a high user preference for Nicaragua and/or earthquake, moderate user preference for Central America, Lack of interest towards plane crashes and lack of interest towards China. This information will influence the composition of future packets.

The user next deletes items 8, 10 and 11 and opens item 9. These decisions are reported to server 20 which adjusts user profile 26 to reflect an affinity for the Republican party and a mild aversion to the Democratic, Libertarian and Socialist parties. As a result, campaign literature from the Democratic, Libertarian and Socialist parties will be excluded from future packets while Republican Party literature from local and New York State elections will be included in future packets. It is important to note that the user will not receive any telephone solicitations or mail from the Republican Party because his identity is unknown to the party.

The user next uses a search engine to look for information on "ski" with a preference for Switzerland. This surfing activity is reported to server 20 which adjusts user profile 26 to include moderate user interest in travel, ski equipment, ski resorts, and Switzerland.

As a result, the composition of subsequent packets will be different. As user interest changes over time, user profile 26 will be corrected so that each packet received contains items 28 which are of current interest to the user.

The user sees opened items practically immediately since they are in memory 24 of user client 22. The speed with which items open allows the user to review more information than if he surfing the Internet.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system for delivering content desired by a specific user among a plurality of users directly to a user client of the specific user via the Internet, the system comprising at least one server including a memory and being designed and configured for:
   (a) receiving a user profile from the specific user, said user profile defining user preferences with respect to a plurality of criteria;
   (b) storing a plurality of content items in said memory, each of said items having a content profile with respect to said plurality of criteria;
   (c) assembling a packet of content items, each of said items in said packet being characterized by a correspondence between said user profile and said content profile;
   (d) sending said packet to the user client of the specific user when bandwidth is available on a channel of communication between said user client and said server, such that connectivity of the user client is affected as little as possible by sending of said packet by said server; and
   (e) sensing available bandwidth in said communication channel and adjusting sending activity accordingly.

2. The system of claim 1, wherein each of said items in said packet is selected from the group consisting of a digital file, a compressed digital file, and a digital file buffered to the size of a communication protocol pack length.

3. The system of claim 1, wherein each of said content items in said packet contains at least one item selected from the group consisting of a picture, text, audio information, an animated picture, a video image and video animation.

4. The system of claim 1, wherein said plurality of criteria include at least one criterion selected from the group consisting of a country of origin, a language, a date, a topic, a keyword and a key phrase.

5. The system of claim 4, wherein said user profile and said content profile each independently contain values for each of said at least one criterion, said values are selected from the group consisting of a predefined list of values, a specific numerical value, a range of numerical values, a rating assigned by an organization and a user mark.

6. The system of claim 5, wherein said user mark is a value between −1 and +1.

7. The system of claim 1, wherein said correspondence between said user profile and said content profile is selected from the group consisting of a Boolean correspondence and a statistical correspondence.

8. The system of claim 1, wherein said server is further designed and configured to receive communications from said user client informing said server of user reactions to said items in said packet and to update said user preferences in said user profile in accordance with said reactions.

9. The system of claim 1, wherein said server is further designed and configured to receive communications from said user client informing said server of an internet surfing activity of the user and to update said user preferences in said user profile in accordance with said internet surfing activity.

10. The system of claim 1, wherein the user is identified only by means of an item selected from the group consisting of the user client used by the user and a random number.

11. The system of claim 1, wherein said content items stored in said memory contain the content desired by the specific user, the content being downloadable to said user client so as to be available to the user without a network connection.

12. A system for receiving content desired by a specific user among a plurality of users via the Internet, the system comprising a user client including a memory and being designed and configured for:
   (a) transmitting a user profile from the specific user to a server, said user profile defining user preferences with respect to a plurality of criteria;
   (b) receiving, when bandwidth is available on a channel of communication between said user client and said server, a packet of content items in said memory, each of said items having a content profile with respect to said plurality of criteria, and notifying the specific user of receipt of said packet;
   (c) storing said packet of content items in a memory device of said user client;
   making available to the specific user said content items in said packet; and
   (e) causing said server to sense available bandwidth in said communication channel and adjust sending activity accordingly;
   such that connectivity of the user client is affected as little as possible by sending of said packet by said server.

13. The system of claim 12, wherein each of said items in said packet is selected from the group consisting of a digital file, a compressed digital file, and a digital file buffered to the size of a communication protocol pack length.

14. The system of claim 12, wherein each of said content items in said packet contains at least one item selected from the group consisting of a picture, text, audio information, an animated picture, a video image and video animation.

15. The system of claim 12, wherein said plurality of criteria include at least one criterion selected from the group consisting of a country of origin, a language, a date, a topic, a keyword and a key phrase.

16. The system of claim 15, wherein said user profile and said content profile each independently contain values for each of said at least one criterion, said values are selected from the group consisting of a predefined list of values, a specific numerical value, a range of numerical values, a rating assigned by an organization and a user mark.

17. The system of claim 16, wherein said user mark is a value between −1 and +1.

18. The system of claim 12, wherein said correspondence between said user profile and said content profile is selected from the group consisting of a Boolean correspondence and a statistical correspondence.

19. The system of claim 12, wherein said user client is further designed and configured to communicate with said server for informing said server of user reactions to said items in said packet.

20. The system of claim 12, wherein said user client is further designed and configured to communicate with said server for informing said server of an internet surfing activity of the user.

21. The system of claim 12, wherein the user is identified only by means of an item selected from the group consisting of the user client used by the user and a random number.

22. The system of claim 12, wherein said content items stored in said memory contain the content desired by the specific user, the content being downloadable to said user client so as to be available to the user without a network connection.

23. A method for delivering content desired by a specific user among a plurality of users directly to a user client of the specific user via the Internet, the method comprising the steps of:
  (a) receiving a user profile from the specific user, said user profile defining user preferences with respect to a plurality of criteria;
  (b) storing a plurality of content items, each of said items having a content profile with respect to said plurality of criteria;
  (c) assembling a packet of content items, wherein each of said items in said packet is characterized by a correspondence between said user profile and said content profile; and (d) sending said packet to the user client of the specific user when bandwidth is available on a channel of communication between said user client and said server; and
  (e) sensing available bandwidth in said communication channel and adjusting sending activity accordingly; such that connectivity of the user client is affected as little as possible by sending of said packet by said.

24. The method of claim 23, wherein each of said items in said packet is selected from the group consisting of a digital file, a compressed digital file, and a digital file buffered to the size of a communication protocol pack length.

25. The method of claim 23, wherein each of said content items in said packet contains at least one item selected from the group consisting of a picture, text, audio information, an animated picture, a video image and video animation.

26. The method of claim 23, wherein said plurality of criteria include at least one criterion selected from the group consisting of a country of origin, a language, a date, a topic, a keyword and a key phrase.

27. The method of claim 24, wherein said user profile and said content profile each independently contain values for each of said at least one criterion, said values are selected from the group consisting of a predefined list of values, a specific numerical value, a range of numerical values, a rating assigned by an organization and a user mark.

28. The method of claim 27, wherein said user mark is a value between −1 and +1.

29. The method of claim 23, wherein said correspondence between said user profile and said content profile is selected from the group consisting of a Boolean correspondence and a statistical correspondence.

30. The method of claim 23, comprising the additional step of:
  (e) receiving communications from said user client informing said server of user reactions to said items in said packet and updating said user preferences in said user profile in accordance with said reactions.

31. The method of claim 23, comprising the additional step of:
  (f) receiving communications from said user client informing said server of an internet surfing activity of the user and updating said user preferences in said user profile in accordance with said internet surfing activity.

32. The method of claim 23, wherein said user profile identifies the user only by means an item selected from the group consisting of the user client used by the user and a random number.

33. The method of claim 23, wherein said content items stored in said memory contain the content desired by the specific user, the content being downloadable to said user client so as to be available to the user without a network connection.

34. A method for delivering content desired by a specific user among a plurality of users directly to the user by means of a user client of the specific user which is in communication with the Internet, the method comprising the steps of:
  (a) transmitting a user profile from the specific user to a server, said user profile defining user preferences with respect to a plurality of criteria;
  (b) receiving, when bandwidth is available on a channel of communication between said user client and said server, a packet of content items, each of said items having a content profile with respect to said plurality of criteria and notifying the specific user of said receipt;
  (c) storing said packet of content items in a memory device of said user client; and
  (d) making available to the specific user said content items in said packet;
  (e) causing said server to sense available bandwidth in said communication channel and adjust sending activity accordingly; such that connectivity of the user client is affected as little as possible by sending of said packet by said server.

35. The method of claim 34, wherein each of said items in said packet is selected from the group consisting of a digital file, a compressed digital file, and a digital file buffered to the size of a communication protocol pack length.

36. The method of claim 34, wherein each of said content items in said packet contains at least one item selected from the group consisting of a picture, text, audio information, an animated picture, a video image and video animation.

37. The method of claim 34, wherein said plurality of criteria include at least one criterion selected from the group consisting of a country of origin, a language, a date, a topic, a keyword and a key phrase.

38. The method of claim 37, wherein said user profile and said content profile each independently contain values for each of said at least one criterion, said values are selected from the group consisting of a predefined list of values, a specific numerical value, a range of numerical values, a rating assigned by an organization and a user mark.

39. The method of claim 38, wherein said user mark is a value between −1 and +1.

40. The method of claim 34, wherein said correspondence between said user profile and said content profile is selected from the group consisting of a Boolean correspondence and a statistical correspondence.

41. The method of claim 34, comprising the additional step of:
(e) informing said server of user reactions to said items in said packet.

42. The method of claim 34, comprising the additional step of:
(f) informing said server of an Internet surfing activity of the user.

43. The method of claim 34, wherein said user profile identifies the user only by means of an item selected from the group consisting of the user client used by the user and a random number.

44. The method of claim 34, wherein said content items stored in said memory contain the content desired by the specific user, the content being downloadable to said user client so as to be available to the user without a network connection.

* * * * *